United States Patent [19]

Seccombe

[11] Patent Number: 5,042,129
[45] Date of Patent: Aug. 27, 1991

[54] BRAKE SHOE DELINING APPARATUS

[75] Inventor: Leonard A. Seccombe, Waterdown, Canada

[73] Assignees: Altec Brake Systems, Inc., Brantford; Gullco International Limited, Toronto, both of Canada

[21] Appl. No.: 611,670

[22] Filed: Nov. 13, 1990

[51] Int. Cl.[5] .............................................. B23P 19/04
[52] U.S. Cl. ........................................ 29/233; 29/252; 29/243.53
[58] Field of Search ...................... 29/233, 252, 243.53, 29/243.54, 243.55; 72/453.19, 453.15, 453.16, 312, 313

[56] References Cited

U.S. PATENT DOCUMENTS

| | | | |
|---|---|---|---|
| 1,587,181 | 6/1926 | Pomeroy et al. | 29/243.53 |
| 3,771,480 | 11/1973 | Johnson | 29/243.53 |
| 4,065,843 | 1/1978 | Elold | 29/233 |
| 4,312,107 | 1/1982 | White | 29/233 |
| 4,365,401 | 12/1982 | Ogren | 29/243.53 |

Primary Examiner—Robert C. Watson
Attorney, Agent, or Firm—Ridout & Maybee

[57] ABSTRACT

A device for removing rivets connecting a brake lining to a brake shoe is provided. The brake shoe is supported and clamped adjacent the rivets. A rivet punch advances through the lining and shoe to expel the rivets. A brake shoe support enables the shoe to be moved relative to the rivet punch in interactive successive steps to remove all rows of rivets attaching the brake lining and brake shoe. Since rivet patterns vary, advantageously the device includes indexing means to align a row of punches with a row of rivets. Additionally, gag means are provided to disable selected punches within the row of punches to match the rivet pattern.

11 Claims, 5 Drawing Sheets

BRAKE SHOE DELINING APPARATUS

The present invention relates to a device for removing rivets connecting a brake lining to a brake shoe.

BACKGROUND OF THE INVENTION

A common type of brake used in automotive and industrial applications includes a cylindrical brake drum having internal mating brake shoes actuated usually by hydraulic cylinders to engage the internal surface of the brake drum. Typically, two segmented brake shoes are actuated radially in opposing directions. The shoes have a curved plate to match the drum surface, and the plate is welded to inward support ribs mounted to the attached mechanism.

The brake shoes each have a brake lining attached to the curved plate surface, and friction between the lining and the rotating drum provides braking force to the rotation of the drum and connected mechanism or wheel. Through repeated use, the friction and heat generated during braking wear and deteriorate the brake lining to the point where brake performance is unacceptable. In repairing the brakes of passenger vehicles the entire brake shoe and attached brake lining are generally replaced. In the case of trucks primarily and industrial machinery such as crane hoists, the worn brake lining is removed from the plate of the brake shoe and replaced with a new lining. Replaceable brake linings are attached to the brake shoe plate with rivets which must be removed and replaced during the relining operation. The rivets are generally arranged in a pattern of rows and columns projecting through the brake lining and brake shoe plate.

Conventionally, during the relining operation, rivets are removed individually using a C-shaped press having a throat into which the edges of the plate and lining project. The brake shoe is secured in a fixed position in a jig which holds the ribs, and the operator moves the C-shaped press along the plate and lining to remove individual rivets. The press has a hydraulically powered punch which extends to engage the rivet and force the rivet through the plate and lining, thereby disengaging the lining.

Different manufacturers of brake shoes use different riveting patterns, and additionally, such patterns may vary depending on shoe size. Due to the varying nature of the riveted connection of the lining, rivets are conventionally removed individually in the time consuming but flexible manner described above. Using such methods, high production and resultant economies of scale are difficult or impossible to achieve.

BRIEF SUMMARY OF THE INVENTION

The present invention provides a device for removing rivets connecting a brake lining to a brake shoe which overcomes the disadvantages of conventional methods and devices in a novel manner also enabling high volume production.

The invention provides an apparatus for removing a brake lining from a brake shoe where the lining is riveted to the shoe. The preferred apparatus comprises a brake shoe support assembly having first and second curved supports spaced apart for engaging curved edge portions of the brake shoe. Spring biased guide means are provided for the support assembly which allow the assembly to be moved from a first to a second position against the spring force, and to be moved back from the second to the first position by the spring force. A rivet punch having a plurality of upright punch rods is positioned between the front and rear curved brake shoe supports. The punch rods are oriented to engage the edge rolled open ends of a row of rivets extending transversely across the brake shoe. Reciprocating punch actuating means operate to hold the shoe against the support assembly while forcing the assembly along the guide means from the first to the second position, thereby forcing the punch rods against the rivet ends of a transverse row of rivets to expel them from the shoe.

In one embodiment of the invention, gag means are provided to selectively disable at least one punch rod, and thereby accommodate varying rivet patterns. Preferably, the gag means are electronically operated, for example, by numerical controls, and indexing means for locating and aligning rows of rivets with the punch rods are preferably provided to automate the delining operation for a specific rivet pattern. A library of rivet patterns and associated numerical control programs may be assembled to accommodate a wide range of brake shoe configurations.

BRIEF DESCRIPTION OF THE DRAWINGS

Referring to FIG. 1, a brake shoe 10 has a curved plate 12 attached to support ribs 13 for mounting the shoe 10 to a brake mechanism. A brake lining 15 is curved for attachment to the curved plate 12. Both the lining 15 and plate 12 have a plurality of holes 16 and 17 which align when the lining 15 is positioned on the plate 12. The lining 15 is attached to the plate 12 by rivets 19 secured through the aligned holes 16 and 17.

Brake shoes 10 employ various rivet patterns for attaching the lining 15 to the curved surface 12. FIG. 2 shows one such pattern 20 where the transverse end rows 1, 2, 6 and 7 each have four rivets, spaced two on either side of the support ribs 13. The pattern 20 of FIG. 2 requires only two rivets per row in the middle transverse rows 3, 4 and 5. The pattern 20 also requires the rivets to align longitudinally in columns a, b, c and d. In the case of transverse rows 3, 4 and 5 having just two rivets, each, the rivets fall in one of the outer columns a or d.

The preferred apparatus of the present invention provides a means for removing rivets 19 from brake shoes 10 having various rivet patterns wherein each transverse row of rivets has either four rivets 19, with one rivets in each of columns a, b, c and d, or has two rivets 19, one each in columns a and d.

Figure 3:
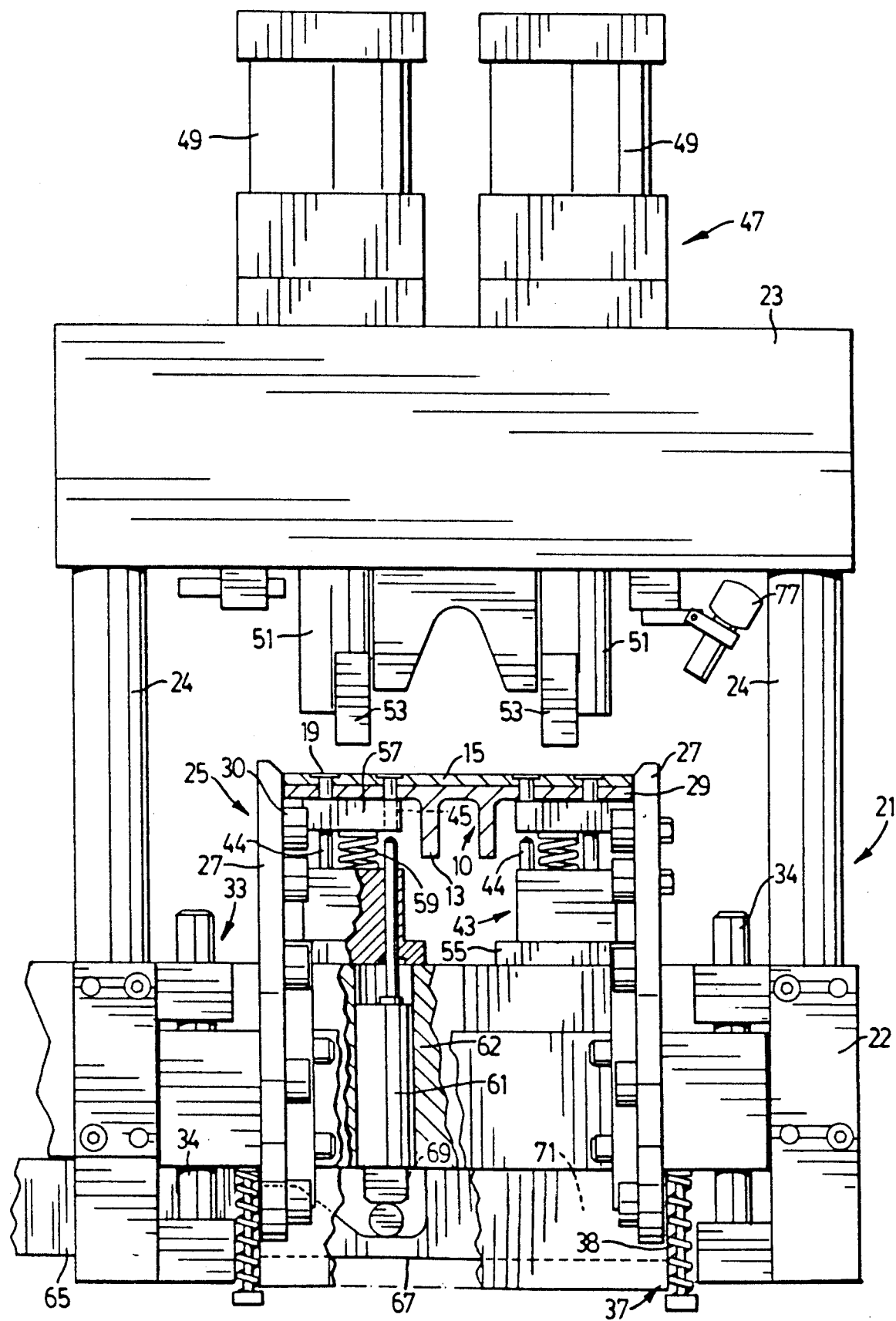
FIG. 3 is a frontal elevation view showing a brake shoe—brake lining assembly positioned in the apparatus with a row of four rivets aligned with the four punches.
Figure 4:
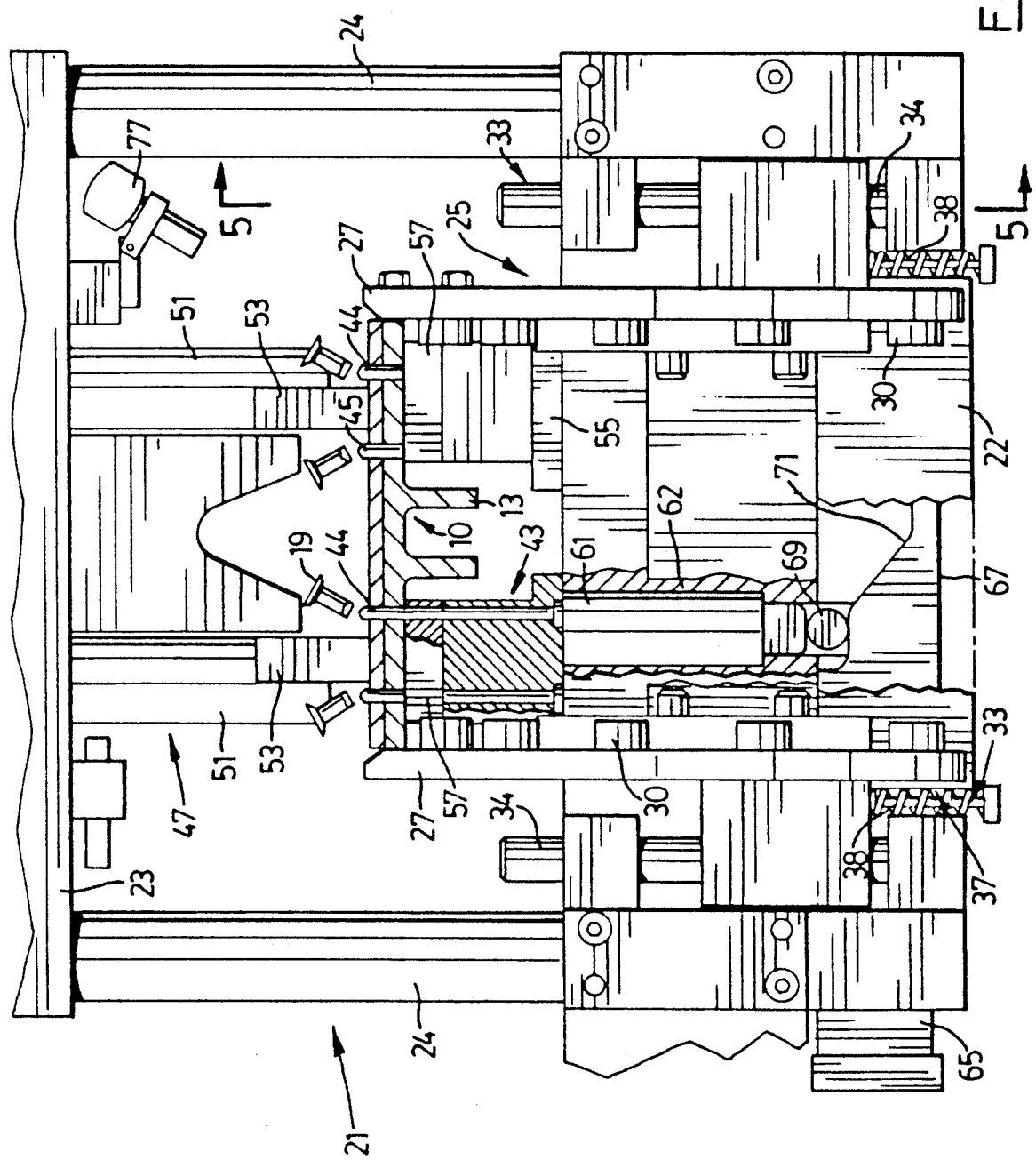
FIG. 4 is a like frontal elevation view showing the hydraulic ram actuator in a lowered position forcing the brake shoe—brake lining assembly and support assembly downward relative to the stationary punches to remove the rivets.
Figure 5:
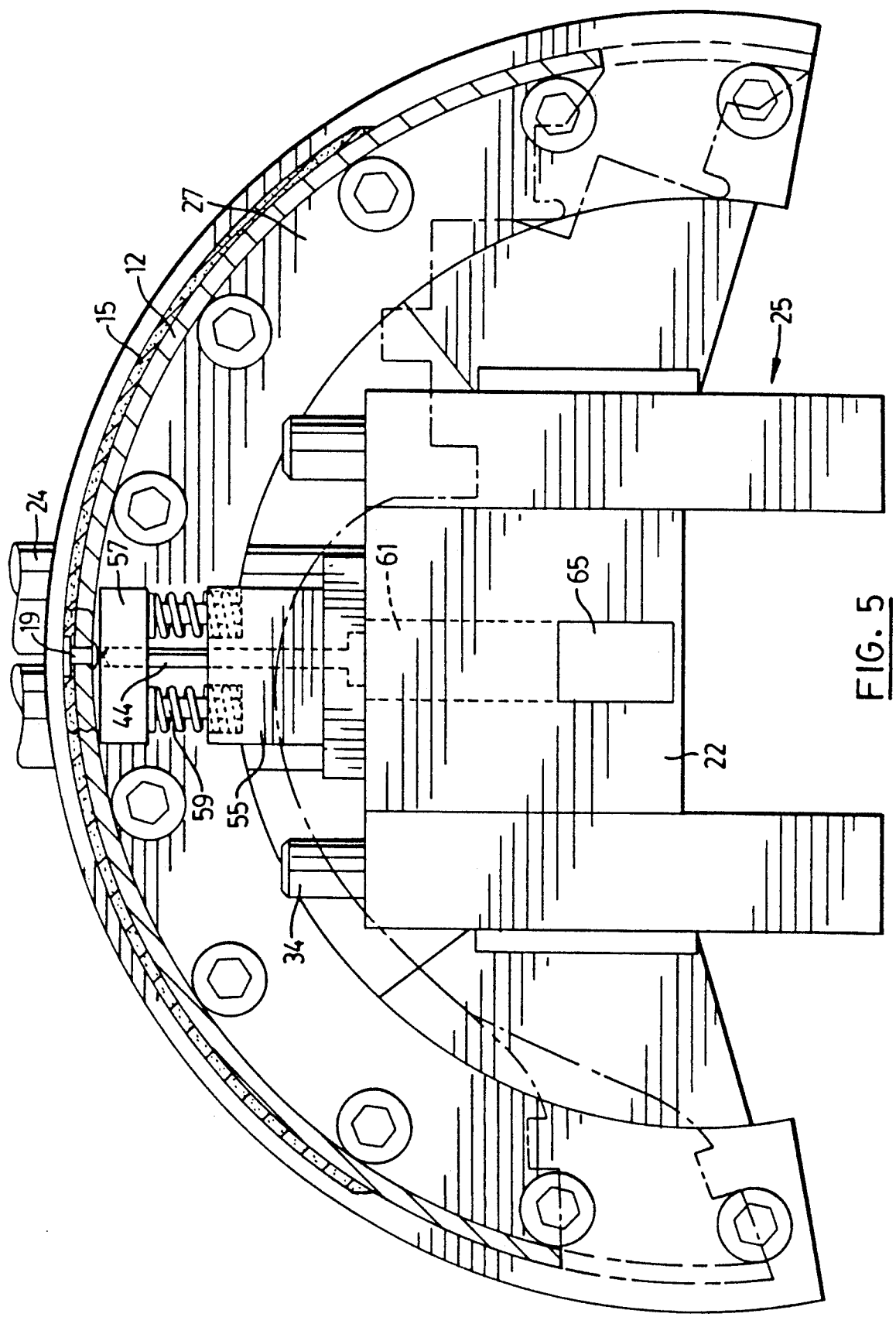
FIG. 5 is a detail side elevation view showing the shoe support and rivet punch.

The preferred apparatus of the invention is shown in FIGS. 3-5, and comprises a frame 21 having a base beam 22 and a crosshead 23 spaced from and supported on the base beam 22 by upright supports 24 spaced at either end of the base beam 22 and crosshead 23.

A brake shoe support assembly 25 has two curved supports 27 spaced from one another to engage the outer curved edge portions 29 of a brake shoe 10. Preferably, the supports 27 have a plurality of rollers 30 for engaging the edge portions 29 of the brake shoe 10 so that movement of the shoe 10 along the support assembly 25 may be facilitated.

A spring biased guide means 33 for the support assembly 27 is attached to the base beam 22. The guide means 33 comprises a pair of upright cylindrical guide members 34 to which each curved support 27 is slidably attached. Helical spring means 37 is positioned beneath each curved support 27, and preferably, the spring means 37 comprise a pair of springs 38 for each curved support 27, each spring 38 being located approximately adjacent each upright cylindrical guide member 34.

Accordingly, the curved supports 27 of the brake shoe support assembly 25 may be moved along the cylindrical guide members 34 independent of the frame 21. A downward force is required to move the curved supports 37 against the bias from the springs 38, and a relaxation of the downward force will allow the curved supports 27 to move back up the guide members 34.

A rivet punch 43 is mounted on the base 22 between the curved supports 27. The rivet punch 43 comprises a plurality of punch rods 44 which are preferably positioned in two modules to engage the edge rolled open ends of rivets 19 in a brake shoe 10 supported on the assembly 25 above the punch 43 (see FIG. 3). The punch rods 44 preferably have conically pointed tips 45 for insertion into the rivet ends 19.

The punch 43 is actuated by overhead means 47 which operate to hold the brake shoe 10 against the support assembly 25 while forcing the shoe 10 and assembly 25 downward so that the punch rods 44 engage the rivet ends 19 and expel the rivets from the shoe 10. Preferred actuating means 47 comprise a pair of hydraulic cylinders 49 mounted on the crosshead 23, each cylinder 49 having a ram 51 engagable with a brake shoe 10 supported on the assembly 25 positioned over the punch 43. As seen in FIGS. 3 and 4, the rams 51 preferably have fingers 53 which engage the shoe 10 so as not to interfere with removal of the rivets 19 by the punch rods 44.

Figure 6:
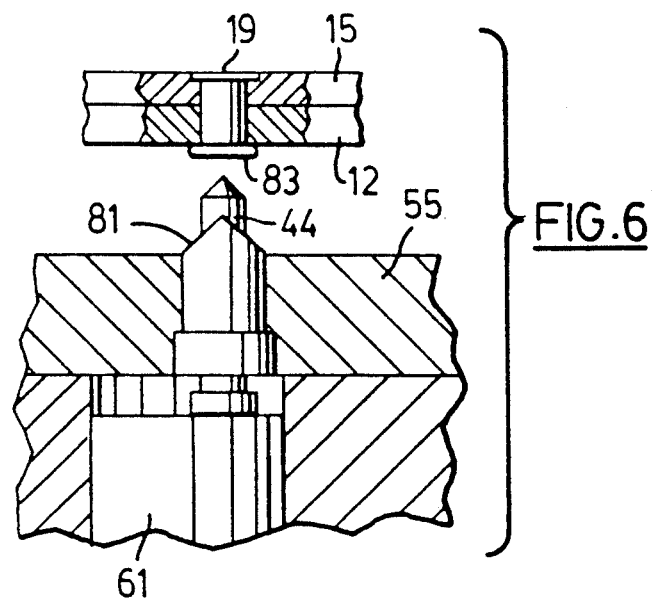
FIG. 6 is a cross sectional detail of an alternative punch arrangement for cutting rivet end rings sheared from each rivet during the punch operation.

As mentioned, the rivets 19 have rolled open end edges for securing the rivets 19 in place (see, for example, FIG. 6). When removing the rivets 19 using the apparatus of the invention, the punch rods 44 shear off the rolled ends of the rivets 19 forming rings which encircle the rods 44. Two alternative means have been devised for removing these end rings from the punch rods 44.

In FIGS. 3 and 4, each set of punch rods 44 is slidably positioned within a base 55 atop which is located a spring loaded stripper plate 57 through which the punch rods 44 extend. When the punch actuating means 47 is retracted as shown in FIG. 3, the stripper plate 57 is positioned about the ends of the rods 44 in opposition to the force provided by springs 59. Upon actuation of the hydraulic rams 51, the punch rods 44 eject the rivets 19 and the stripper plates 57 are forced down on the bases 55. Retraction of the rams 51 allow the stripper plates 57 to move up the rods 44 to remove the rivet end rings.

Figure 7:
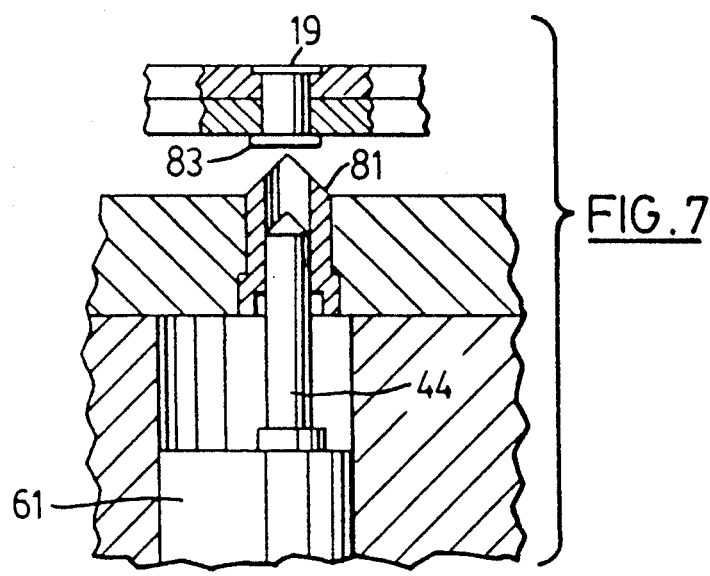
FIG. 7 is a cross sectional detail of the arrangement of FIG. 6 wherein the punch is in the retracted position.
Figure 8:
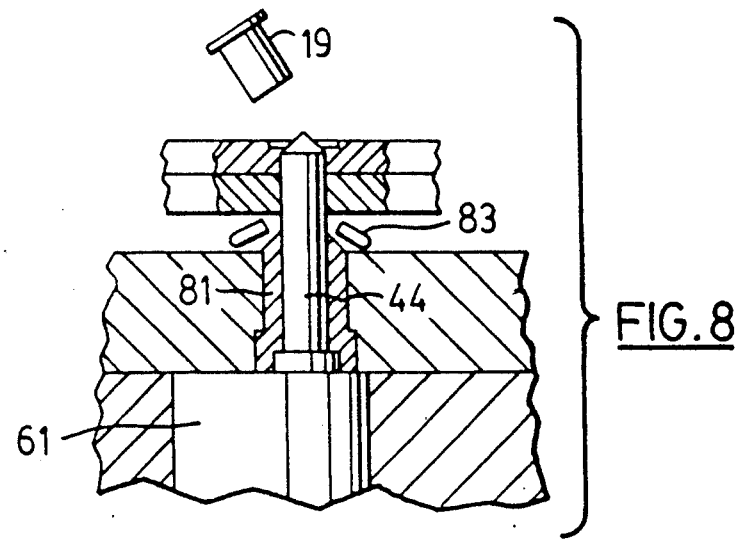
FIG. 8 is a cross sectional detail of the arrangement of FIG. 6 wherein the punch is in the raised position and the cutter operates to split the ring end of the rivet.

It has been found that the arrangement of FIGS. 3 and 4 is not wholly satisfactory as the end rings tend to become trapped between the stripper plate 57 and the shoe 12. An alternative solution to the problem of removing the rivet end rings from the punch rods 44 is shown in FIGS. 6-8, where the spring loaded stripper plates 57 are replaced by a ring cutter 81 positioned about each rod 44. The cutter 81 is positioned on the punch 43 so as to avoid contact with the shoe plate 12 during the punch operation, but as rivet end rings 83 move down the rods 44 they are forced against the cutting edges of the cutters 81 and eventually are cut off the rods 44 with the pieces falling harmlessly away.

Figure 1:
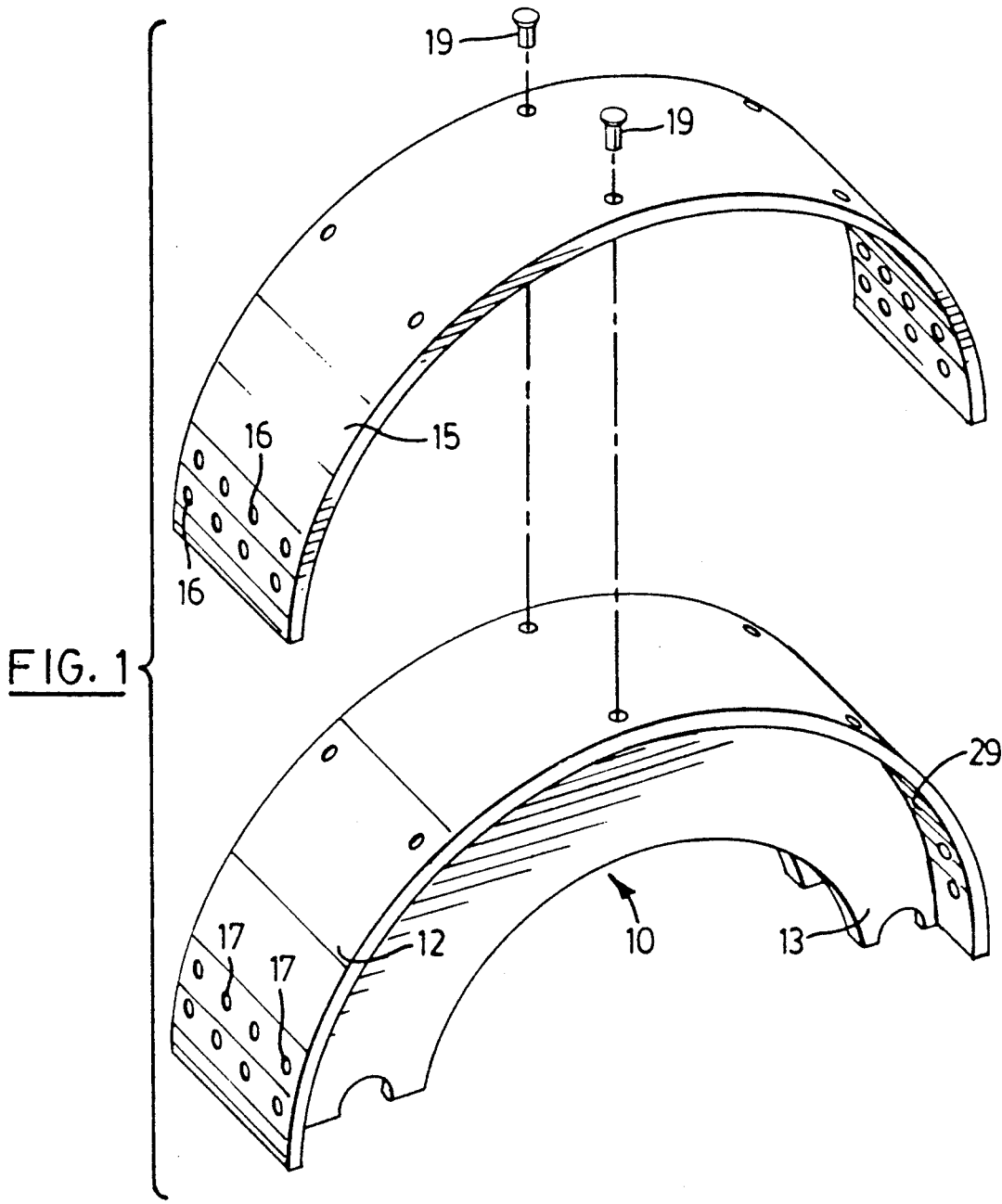
FIG. 1 is an exploded perspective view of a brake shoe and associated brake lining.
Figure 2:
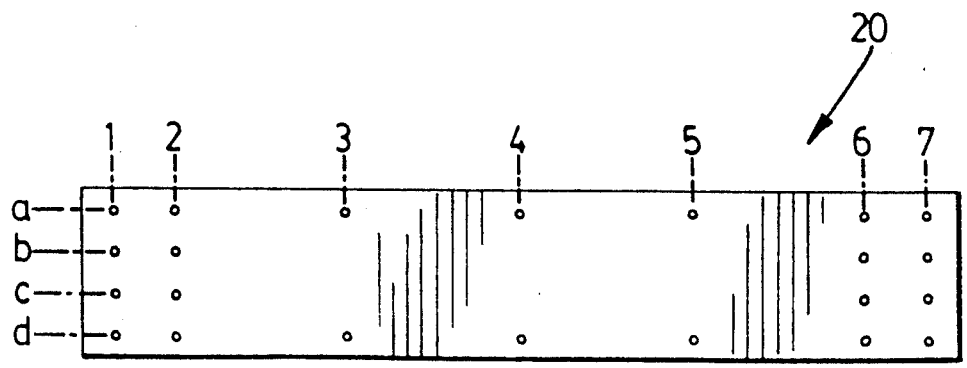
FIG. 2 is a view of the developed outer surface of the brake lining showing a rivet hole pattern of four longitudinal columns (a, b, c, d) and seven transverse rows (1 to 7).

In the preferred embodiment illustrated in the drawings, the punch rods 44 are aligned transversely of the brake shoe 10 to engage a single row of four rivets 19. As shown in the rivet pattern of FIG. 2, this arrangement is suitable for removal of rivets 19 in rows 1, 2, 6 and 7. However, the arrangement of four transverse fixed punch rods 44 is not suitable for removal of rivets 19 located in columns a and d only of FIG. 2. Accordingly, the invention preferably includes gag means for selected punch rods 44, for example, those rods 44 used for removing rivets 19 in columns b and c of FIG. 2.

The preferred gag means for use in the present apparatus comprises, a backup block 61 slidably positioned in a bore 62 in the transverse frame base 22. The backup block 61 is located beneath a punch rod 44 which in turn is slidably positioned in the punch module base 55. Thus, activation and deactivation of the punch rod 44 and backup block 61 arrangement is effected by the vertical positioning of the block 61 in the bore 62. This vertical positioning is governed by a tongue 65 slidably positioned in a bore 67 extending through the base beam 22 transversely beneath the backup block 61. A cam 69 is located between the bottom of the backup block 61 and the upper surface of the tongue 65. The tongue 65 has a cam following surface 71 which coacts with the cam 69 upon sliding the tongue 65 in the transverse bore 67 to raise and lower the block 61. As shown in FIG. 3, sliding the tongue 65 to the left causes the backup block 61 to be lowered thereby deactivating or gagging the associated punch rod 44. This gag means is also fully compatible with the punch rod 44 and cutter 81 arrangement shown in FIGS. 6-8.

The skilled person will appreciate from the foregoing description that the apparatus of the invention is readily adaptable to semiautomatic operation. Movement of the tongue 65 may be programmed into an electronic numerical control means so that the apparatus can be used in association with a library of rivet patterns. The reciprocating punch actuating means 47 can be governed by automatic indexing means such as an electronic optical sensor 77 which triggers the actuator 47 upon sensing a rivet head 19.

Operation of the semiautomatic apparatus requires the operator to place a brake shoe on the support assembly 25 so that the shoe may be moved along the rollers 30 of the curved supports 27 by manual action. After setting the tongue controller for the rivet pattern of the shoe 10 on the support assembly 25, the operator moves the shoe 10 along the arcuate path of the assembly 25 pausing at each row of rivets as dictated by the optical sensor to effect removal of them by the punch 43.

I claim:

1. An apparatus for removing a brake lining from a brake shoe, the lining being riveted to the shoe through a plurality of rivet holes being defined in the lining and shoe, the apparatus comprising:

a frame having a transverse base member and a transverse crosshead connected by upright supports;

a brake shoe support assembly mounted on the transverse base member, the support assembly having first and second curved supports spaced apart for engaging curved edge portions of the brake shoe, said first and second curved supports having rollers attached thereto, the rollers being engagable with the brake shoe to facilitate movement of the brake shoe along the support assembly;

spring biased guide means for the brake shoe support assembly, which means allow the support assembly to be moved relative to the transverse base member from a first to a second position against the spring bias, and to be moved back from the second to the first position by the spring bias;

a rivet punch attached to the transverse base member, the punch having a plurality of upright punch rods positioned between the front and rear curved brake shoe supports, the punch rods being engagable with edge rolled open ends of a row of rivets extending transversely across the brake shoe; and reciprocating punch actuating means extending from the frame crosshead for holding the brake shoe against the support assembly while causing the assembly to be moved from the first to the second position against the spring bias of the guide means, thereby forcing the punch rods against the rivet ends of a transverse row of rivets to force the rivets through the rivet holes and expel them from the brake shoe.

2. An apparatus as claimed in claim 1, further comprising indexing means for aligning the rivet punch with the rivets.

3. An apparatus as claimed in claim 2, wherein the indexing means comprise electronic optical means for sensing rivets, the indexing means coacting with the punch actuating means to trigger the actuator upon sensing a rivet.

4. An apparatus as claimed in claim 1, further comprising gag means for selectively disabling at least one punch rod.

5. An apparatus as claimed in claim 4, wherein the gag means comprise:

a backup block being slidably positioned beneath a punch rod which is also slidably positioned in the rivet punch, the backup block being movable between punch active and inactive positions by means of a cam and a slidable backup block actuating tongue having a cam following surface, the cam coacting with the backup block and cam following surface of the tongue to activate or inactivate the punch rod.

6. An apparatus as claimed in claim 5, further comprising programmable tongue actuating means for electronically sequencing the inactivation of a punch rod during the delining of a brake shoe.

7. An apparatus as claimed in claim 1, wherein the punch actuating means comprise at least one hydraulic cylinder coacting with the brake shoe support assembly to move it against the spring bias of the guide means.

8. An apparatus as claimed in claim 1, further comprising spring loaded stripper means for removing the sheared off edge rolled end portion of a rivet from a punch rod.

9. An apparatus as claimed in claim 8, wherein the spring loaded stripper means comprises a stripper plate defining holes through which punch rods may extend, the plate coacting with spring means during the punch operation to permit movement of the plate downwardly along the rods and then back up along the rods to expel said rivet end portions from about the rods.

10. An apparatus as claimed in claim 1, further comprising cutting means for removing the sheared off edge rolled end portion of a rivet from a punch rod.

11. An apparatus as claimed in claim 10, wherein the cutting means is a ring cutter positioned about each rod, the rod being slidable relative to the cutter, the cutter having cutting edges to cut the edge rolled end portions of rivets from the rod as the end portions are forced onto the cutting edges under the downward force of the punch operation.

* * * * *

UNITED STATES PATENT AND TRADEMARK OFFICE
CERTIFICATE OF CORRECTION

PATENT NO. : 5,042,129
DATED : Aug. 27, 1991
INVENTOR(S) : Leonard A. Seccombe

It is certified that error appears in the above-identified patent and that said Letters Patent is hereby corrected as shown below: On the title page, Item [73]
Assignee: Altec Brake Systems, Inc., Brantford, Canada Signed and Sealed this Fifth Day of October, 1993

Attest:

BRUCE LEHMAN

Attesting Officer

Commissioner of Patents and Trademarks